United States Patent [19]
Kawakami et al.

[11] Patent Number: 5,748,139
[45] Date of Patent: May 5, 1998

[54] RADAR TRANSPONDER

[75] Inventors: Youichi Kawakami; Tohru Dochi, both of Tokyo, Japan

[73] Assignee: Mitsubishi Denki Kabushiki Kaisha, Tokyo, Japan

[21] Appl. No.: 647,800

[22] Filed: May 15, 1996

[30] Foreign Application Priority Data

May 26, 1995 [JP] Japan ................... 7-128131

[51] Int. Cl.⁶ .................................................. G01S 13/76
[52] U.S. Cl. .................................... 342/51; 342/198
[58] Field of Search .................... 342/42, 44, 51, 342/198, 175; 340/825.34, 825.54

[56] References Cited

U.S. PATENT DOCUMENTS

| | | | |
|---|---|---|---|
| 2,656,530 | 10/1953 | Grant et al. | 342/51 |
| 3,922,674 | 11/1975 | Gingras et al. | 342/44 |
| 3,946,393 | 3/1976 | Dunne et al. | 342/44 |
| 3,967,202 | 6/1976 | Batz | 342/42 |
| 4,121,208 | 10/1978 | Becker et al. | 342/44 |
| 4,129,868 | 12/1978 | Tahara et al. | 342/51 |
| 4,138,676 | 2/1979 | Becker et al. | 342/44 |
| 4,167,007 | 9/1979 | McGeoch et al. | 342/44 |
| 4,213,129 | 7/1980 | Kennedy et al. | 342/51 |
| 4,345,253 | 8/1982 | Hoover | 342/44 |
| 4,703,327 | 10/1987 | Rossetti et al. | 342/44 |
| 4,885,588 | 12/1989 | Kawakami | 342/51 |
| 4,980,689 | 12/1990 | Kawakami | 342/51 |
| 5,479,172 | 12/1995 | Smith et al. | 342/51 |
| 5,504,485 | 4/1996 | Landt et al. | 342/42 |

FOREIGN PATENT DOCUMENTS

| | | |
|---|---|---|
| 0308877 | 3/1989 | European Pat. Off. . |
| 0384615 | 8/1990 | European Pat. Off. . |
| 0625831 | 11/1994 | European Pat. Off. . |
| 8800760 | 1/1988 | WIPO . |
| 9422531 | 10/1994 | WIPO . |

*Primary Examiner*—John B. Sotomayor
*Attorney, Agent, or Firm*—Rothwell, Figg, Ernst & Kurz

[57] ABSTRACT

A radar transponder for a stable and reliable response transmission upon reception of a weak radar signal having a reflection-conscious circuitry free from damage by a transmit effect, including a reception damage by the leakage of a powerful transmit wave signal and a transmission damage by the reflection of the powerful transmit wave signal. The reflection-conscious circuitry may include a circulator coupled to the transmit/receive antenna for selecting the powerful transmit wave signal or the weak radar signal, a receiving circuit provided after the circulator for receiving the weak radar signal, and an SPDT switch provided between the circulator and the receiving circuit for passing an input of the weak radar signal to the receiving circuit in a receiving period with its ground function dormant and for leading an input of the powerful transmit wave signal to a ground using the ground function in a transmitting period. The SPDT switch includes a reflectionless terminator at the entry of the input signal, a diode having a ground end at the outlet of the input signal, a quarter-wave line between the entry and the outlet and a drive signal input for driving the ground function.

15 Claims, 10 Drawing Sheets

RADAR TRANSPONDER

BACKGROUND OF THE INVENTION

1. Field of the Invention

The present invention relates to a method and apparatus for signal transmission in a radar transponder, and more specifically, to the circuitry of a radar transponder which is designed to receive a weak radar signal and transmit a relatively powerful wave signal in response to a search radar signal, for example. The inventive radar transponder is capable of maintaining a stable and reliable response transmission while avoiding adverse effects of an imbalance of signal power caused by leakage from the transmission signal and also by environmental factors.

2. Discussion of the Conventional Art

Figure 11:
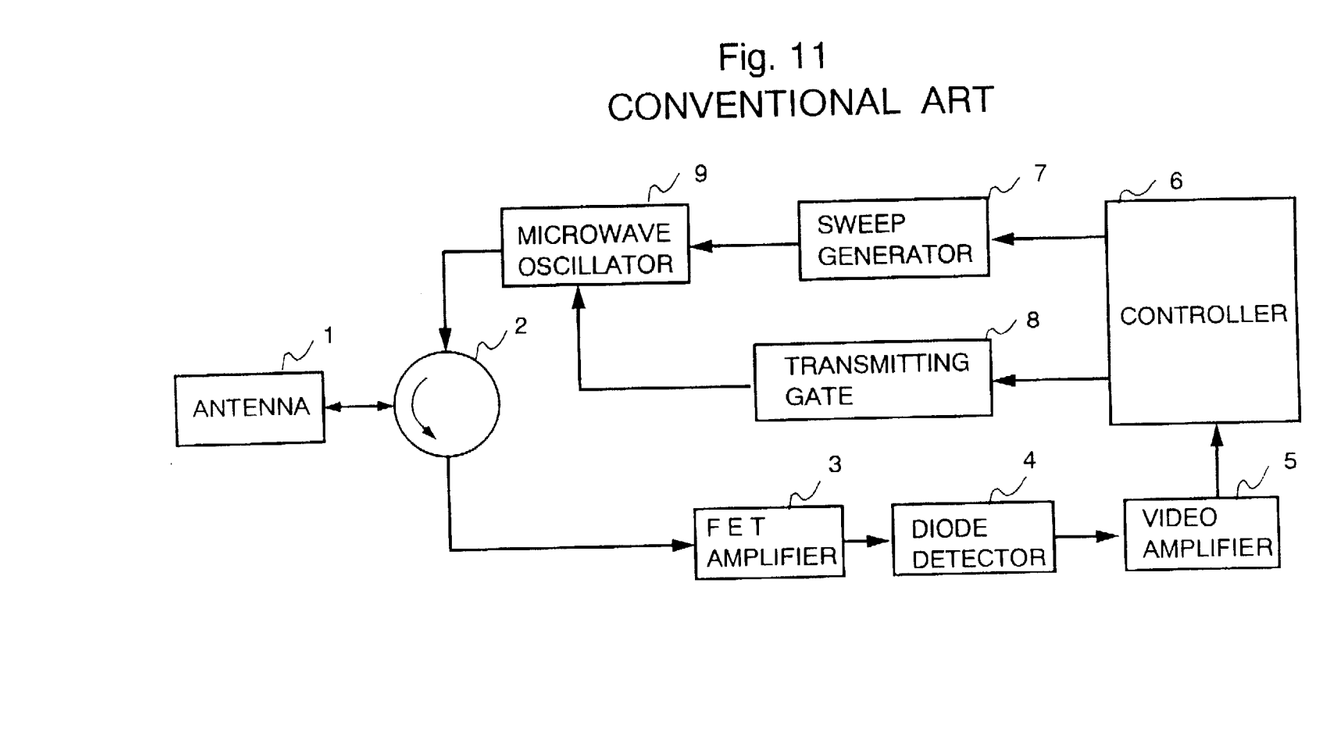
FIG. 11 shows a block diagram of the circuitry of a conventional radar transponder.

FIG. 11 shows a block diagram of the circuitry of a conventional radar transponder including transmit/receive (T/R) antenna 1, circulator 2 as a selector and controller 6 and receiving and transmitting circuits. The receiving circuit includes FET amplifier 3, diode detector 4, and video amplifier 5, and the transmitting circuit includes sweep generator 7, transmitting gate 8 and microwave oscillator 9. Referring to the figure, a radar signal received at T/R antenna 1 or a receive signal is input through circulator 2 to the receiving circuit where the receive signal is amplified in FET amplifier 3, an amplified signal is detected in diode detector 4, and a detected signal is video-amplified in video amplifier 5 to become a trigger signal. The trigger signal reaches controller 6 to trigger a transmitting operation in the transmitting circuit. Controller 6 triggers sweep generator 7 to generate a sweep signal for frequency-sweeping of a microwave signal generated in microwave oscillator 9, and at the same time triggers transmission gate 8 open to issue a transmitting gate signal for a predetermined duration to control the timing of the microwave signal in microwave oscillator 9. The transmitting circuit thus outputs a frequency-swept microwave signal for the predetermined duration while transmission gate 8 is held open in the transmitting period. The microwave signal or a transmit signal is then transferred through circulator 2 to T/R antenna 1 where a powerful radio wave signal is emitted to a search radar signal.

One characteristic property of such circuitry in terms of imbalanced signal power between reception and transmission, where there is present a weak radar reception signal and a relatively powerful wave signal, relates to a transmit effect from leakage of the powerful wave signal into the receiving circuit in the transmitting period. Upon reception of the powerful wave signal, the receiving circuit amplifies the powerful wave signal inappropriately, causing a saturation in the receiving circuit, thereby resulting in a series of continuous trigger signals issued to the controller 6 and ending in a malfunction of the circuitry. A similar problem relating to the transmit effect may occur in other types of radar transponders without selectors and equipped with a set of individual transmit and receive antennas and sharing a relatively narrow spatial range for transmission and reception.

With respect to the characteristics of receiving circuits designed to amplify a weak radar signal, there are also environmental effects resulting from factors such as noise and temperature which, apart from the "transmit effect" described above, may also cause erroneous reception resulting in a possible erroneous response transmission.

SUMMARY OF THE INVENTION

The present invention is directed to solving the problems discussed above relating to the transmit effect resulting from the characteristics of circuitry relating to signals which are imbalanced in power as between reception and transmission, and to environmental effects from factors such as temperature and noise on such receiving circuits designed to amplify weak radar signals. The present invention provides a radar transponder equipped with an improved circuitry having a reflection sensitive property against the transmit effect on the transmitting circuit, which guarantees a sound and reliable response transmission, and an environmentally responsive property against environmental effects on the receiving circuit, which guarantees a sound and stable reception and a consequent sound and reliable response transmission.

This and other objects are accomplished by the present invention as hereinafter described in further detail.

According to one aspect of the present invention, a radar transponder for transmitting a transmit signal during a transmitting period after receiving a receive signal during a receiving period may include a transmit/receive antenna, a receiving circuit for receiving the receive signal during the receiving period, a selector connected to the transmit/receive antenna for selecting and connecting the transmit signal to the transmit/receive antenna during the transmitting period and for selecting and connecting the receive signal from the transmit/receive antenna to the receiving circuit during the receiving period, and a radio frequency switch connected between the selector and the input of the receiving circuit for terminating the transmit signal to ground before the input of the receiving circuit during the transmitting period and for passing the receive signal through to the input of the receiving circuit during the receiving period.

According to another aspect of the present invention, the radio frequency switch of the radar transponder is driven by a switch driving signal and the switch may include a reflectionless terminator connected at the input side of the switch relative to the receiving circuit, a line connected between the input side and the output side of the switch for impedance matching with the transmit signal, and a diode connected to the output side of the switch relative to the receiving circuit for terminating the transmit signal to ground upon application of the switch driving signal to the switch during the transmitting period and for isolating the receive signal from ground during the receive period.

According to another aspect of the present invention, the radar transponder includes means for operating the switch to continue to terminate the transmit signal to ground for a period extending later than the end of the transmitting period, and the receiving circuit thereby begins to receive the receive signal at a time later than the end of the transmitting period.

According to another aspect of the present invention, a method of receiving a signal at a radar transponder having a receiving circuit for receiving a receive signal during a receiving period and means for transmitting a transmit signal during a transmitting period may include the steps of providing an RF switch before the input of the receive circuit and terminating the transmit signal to ground through the RF switch during the transmitting period, and receiving the receive signal through the RF switch and isolating the receive signal from ground during the receiving period.

BRIEF DESCRIPTION OF THE DRAWINGS

For a fuller understanding of the nature and objects of the present invention, reference should be made to the following detailed description and the accompanying drawings, in which.

DESCRIPTION OF THE PREFERRED EMBODIMENTS

Embodiment 1.

In embodying the present invention, a switch which is shown in the form of a single-pole double-throw (SPDT) switch is employed upstream of the input of the receiving circuit for blocking the powerful transmit wave signal against the transmit effect of leakage from the transmitting circuit in order to achieve a reliable response transmission. The reflection sensitive switch is designed to be reflection absorbing so that the switch absorbs the reflection tendencies of the powerful transmit wave signal, and thereby prevents, and secures the transmitting circuit from, reflection related damage and an erroneous response transmission.

Figure 1A:
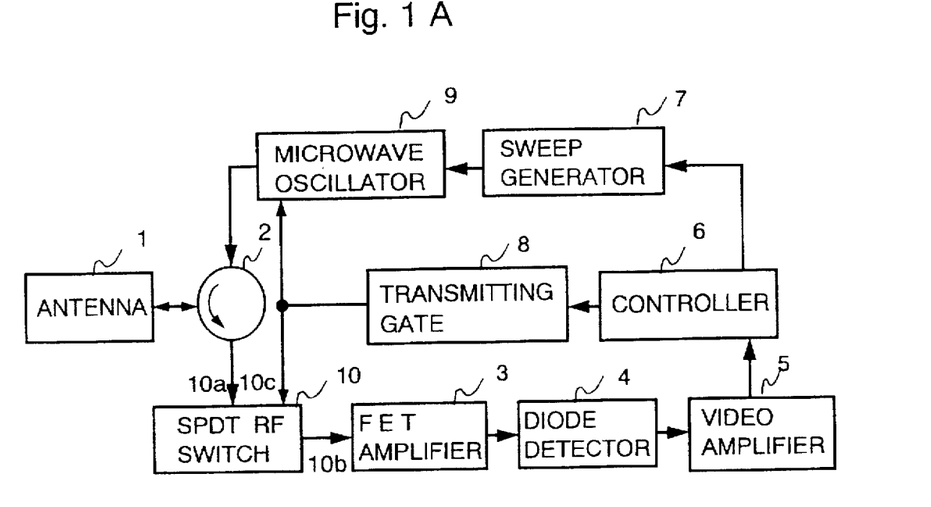
FIG. 1A shows a block diagram of the circuitry of a radar transponder according to a first embodiment of the present invention.

FIG. 1A is a block diagram of the circuitry of a radar transponder according to an embodiment of the present invention. Those elements of FIG. 1A which are numbered and labeled the same as the elements of FIG. 11 are the same in function as those of FIG. 11. The embodiment of FIG. 1A includes a switch means in the form of an SPDT RF switch 10 provided between circulator 2 and FET amplifier 3 in the prior stage at input 10b of the receiving circuit and with an additional signal input at 10c from transmitting gate 8 to SPDT RF switch 10. SPDT RF switch 10 has a single-pole mechanism next to circulator 2 at the entry point of the transmit powerful wave signal to the receiving circuit, as illustrated in FIG. 1B in detail, and is designed to have an optimal input impedance in any mode of operation.

Figure 1B:
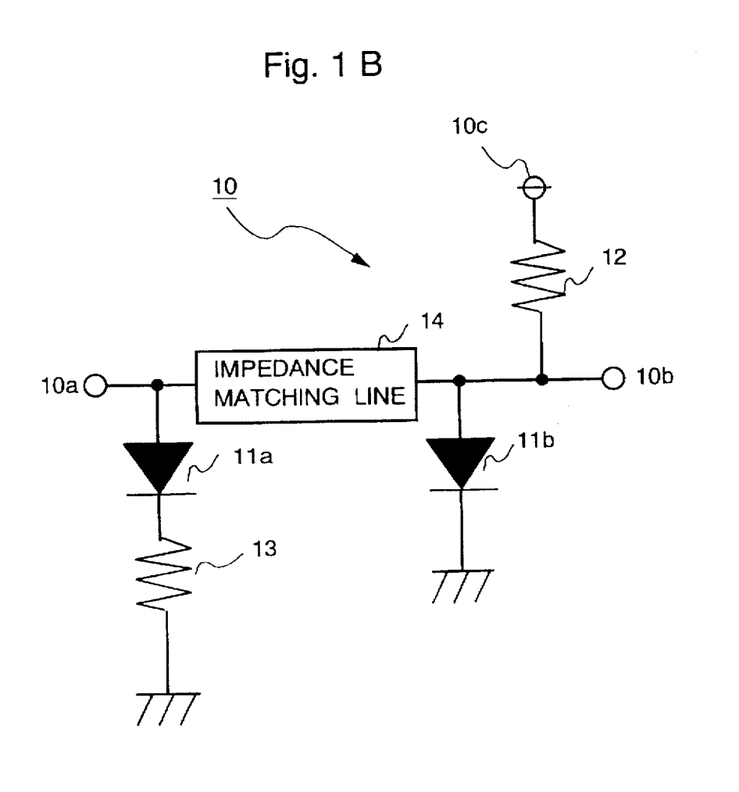
FIG. 1B shows the SPDT RF switch of the circuitry of FIG. 1A in detail.

Referring to FIG. 1B, SPDT RF switch 10, coupled at the entry point 10a of circulator 2 and at its outlet to input 10b to FET amplifier 3, includes impedance matching line 14 of a quarter-wave length microstrip line provided between pin-diodes 11a and 11b on a transmission line, current control resistor 12 provided between pin-diode 11b and outlet 10b, and drive signal input 10c for the entry of a switch drive signal. Pin-diode 11a, provided next to entry 10a, is connected to 50 ohm reflectionless terminator 13 and pin-diode 11b to ground.

SPDT RF switch 10 is driven to the ON condition by the receiving the switch signal which is transmitted from transmitting gate 8 as the transmitting gate signal in the transmitting period in the same manner as discussed in the conventional art. SPDT RF switch has a ground connection function for connecting the input of the powerful transmit wave signal appearing at 10a to ground at pin-diode 11b upon reception of the switch drive signal, thereby blocking the powerful transmit wave signal from the input of the receiving circuit. The ground function does not operate except upon reception of the switch drive signal at 10c; that is, the input of the weak radar receive signal is not grounded and is directly inputted to the receiving circuit through impedance matching line 14. This is because the signal level of the weak radar signal is below the forward threshold of the pin-diodes 11a and 11b such that the forward impedance of diodes 11a and 11b is high presents essentially an open circuit to the weak radar signal.

The operation of the inventive circuitry of this embodiment is equivalent to that of the conventional art for a weak radar signal when the SPDT RF switch 10 of FIG. 1B is not set in its ON ground function. Specifically, in the receiving period a weak radar signal received at T/R antenna 1 is transferred directly to the receiving circuit through circulator 2 and SPDT RF switch 10 is open at pin-diode 11b with its ground function dormant. As mentioned above, the signal level of the received weak radar signal is below the threshold level of the pin-diodes 11a and 11b, which therefore present a high impedance essentially open circuit to the received weak radar signal. With the ground function set to OFF, the weak radar signal is amplified through the series of normal operations in the receiving circuit in the same manner as discussed with reference to the prior art of FIG. 11, involving FET amplifier 3, diode detector 4, and video amplifier 5, and operation of the trigger signal at the end of the receiving period. The trigger signal is outputted to controller 6 to signal a change in the mode of operation from the receiving period to the transmitting period. In the transmitting period, controller 6 outputs the mode signal to the transmitting circuit. Upon reception of the mode signal, transmitting gate 8, in particular, outputs the transmitting gate signal to SPDT RF switch 10 as well as to microwave oscillator 9.

With further reference to the ground function of SPDT RF switch 10 blocking the input of the powerful transmit wave signal before the input to the receiving circuit, the switch drive signal reaches the switch 10. When drive signal input 10c receives the switch drive signal, a current flows in the forward direction via current control register 12 to pin-diode 11b connected to a ground to cause a short-circuit in SPDT RF switch 10. In this condition, an input of the powerful transmit wave signal is led to a ground at pin-diode 11b, which does not allow the wave signal to reach the receiving circuit. SPDT RF switch 10 also has a reflectionless characteristic contributing to the reduction or elimination of reflection corresponding to the input powerful transmit wave signal. The corresponding reflection is absorbed in reflectionless terminator 13 and also through impedance matching line 14 of a distributed constant line by matching the impedance with that of the input powerful wave signal. The 50 ohm reflectionless terminator 13 thus functions to allow SPDT RF switch 10 to maintain an optimal input impedance. Thus, SPDT RF switch 10 blocks the transmit powerful wave signal before it reaches the receiving circuit and also provides optimal absorption of the corresponding reflection of the transmit powerful wave signal. This assures a sound and stable reception in the receiving circuit and a sound and reliable response transmission in the transmitting circuit.

With further reference to SPDT RF switch 10, a variety of different switch types may be employed instead of the shown and described single-pole mechanism at the entry of the transmit wave signal.

With further reference to impedance matching line 14, other impedance matching means may be employed, such as a three-quarter wave length line instead of the quarter-wave length line. In this case, the pin-diode 11b also causes a short-circuit resulting in grounding the input of the wave signal and thereby avoiding reception damage in the receiving circuit and further absorbs the corresponding reflection by means of an optimal input impedance, avoiding a reflection which can cause damage to microwave oscillator 9. This assures a normal and sound transmission in the transmitting circuit.

The features of this embodiment may also be implemented in other types of circuitry of radar transponders equipped with individual transmit and receive antennas other than a T/R antenna.

Embodiment 2.

It must not be overlooked that the transmit effect resulting from leakage also occurs after the completion of a response transmission because a powerful transmit wave signal remains in the circuitry even in the transitional period from transmission to reception. In this respect, the present invention provides a timing-sensitive operation which is effective against the transmit effect caused by such a remaining signal and efficiently blocks the powerful transmit wave signal before it enters the receiving circuit.

Figure 2:
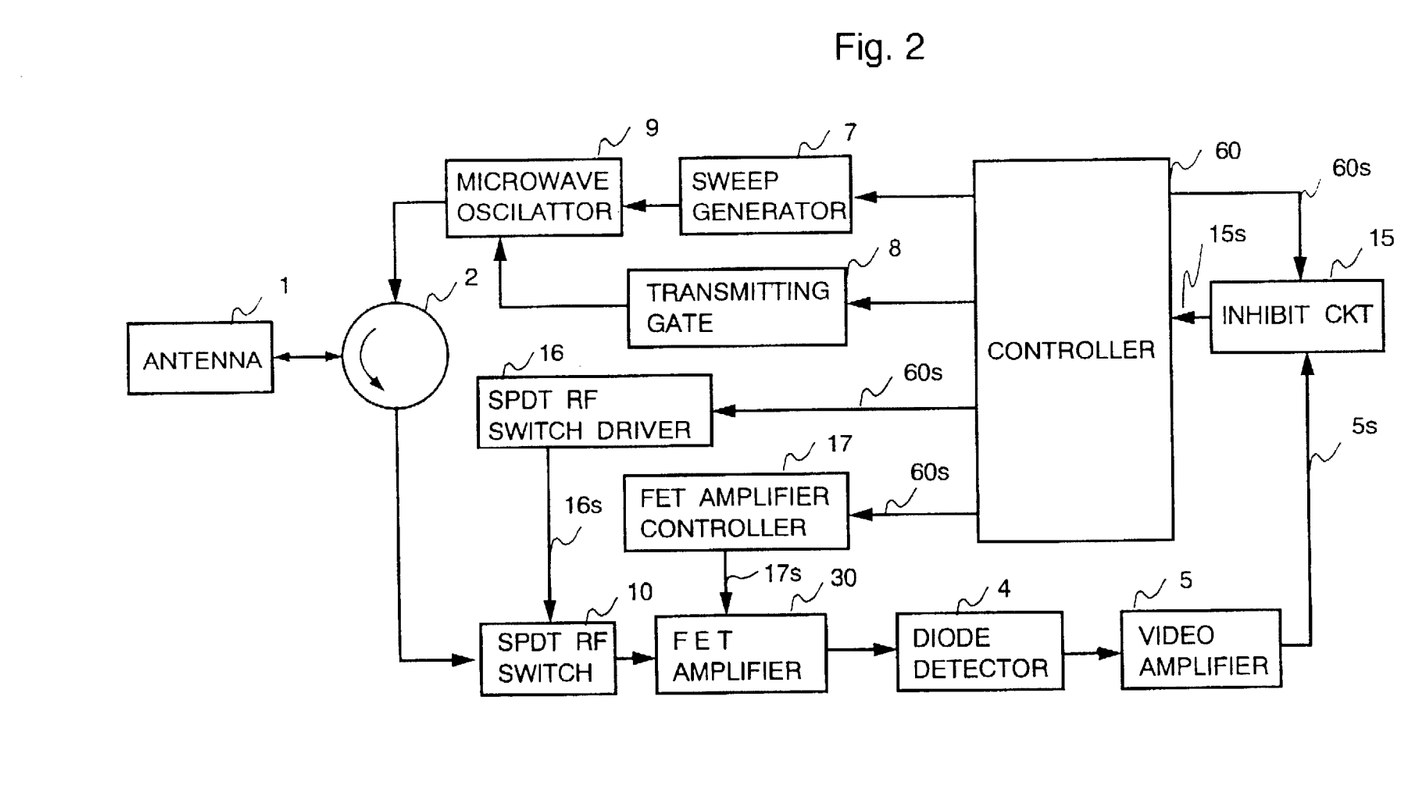
FIG. 2 shows a block diagram of the circuitry of a radar transponder according to a second embodiment of the present invention.

FIG. 2 shows a block diagram of the circuitry of a radar transponder providing such a timing-sensitive operation according to another embodiment of the present invention. The embodiment of FIG. 2 modifies the embodiment of FIG. 1 with an additional inhibit circuit 15 for inhibiting the reception of the trigger signal in the controller and masking input of the trigger signal from the receiving circuit by controlling the timing of a gate. In this embodiment, SPDT RF switch driver 16 generates a switch drive signal 16s which is controlled by gate timing. In this embodiment, the switch drive signal is separated from the transmitting gate signal. FET amplifier controller 17 suppresses the operation of FET amplifier 30 through a controlled gate timing. The FET amplifier 3 and controller 6 of FIG. 1 are replaced, respectively, with FET amplifier 30 having an additional input from FET amplifier controller 17, and controller 60 having additional outputs 60s to inhibit circuit 15, SPDT RF switch driver 16 and FET amplifier controller 17.

Figure 3A:
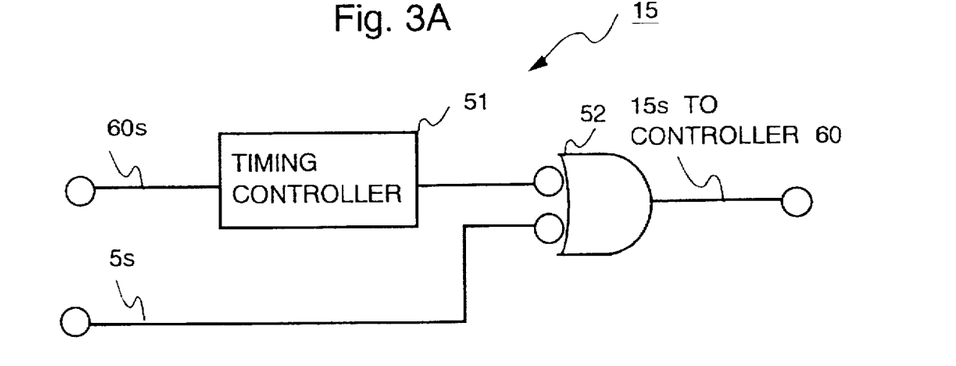
FIG. 3A shows the inhibit circuit of the circuitry of FIG. 2 in detail.

FIG. 3A shows inhibit circuit 15 of FIG. 2 in detail in which signal 5s from video amplifier 5 and mode signal 60s from controller 60, which is time-controlled through timing controller 51, are NORed at NOR gate 52 to output signal 15s to controller 60.

Figure 3B:
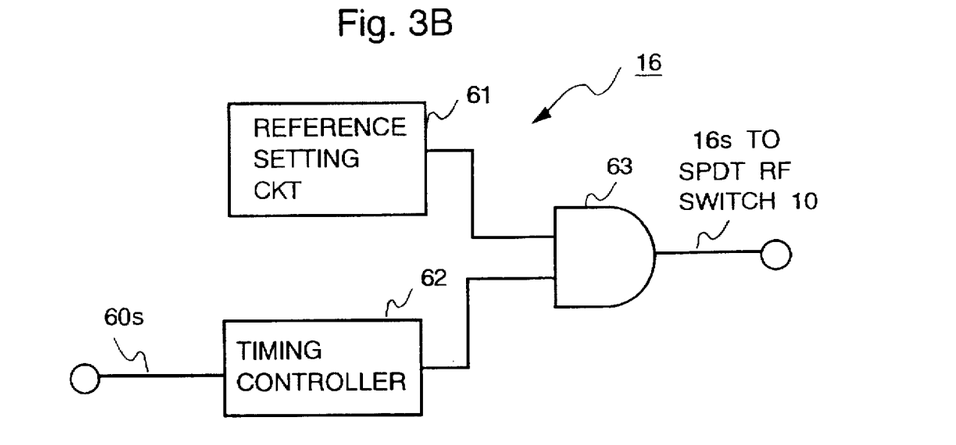
FIG. 3B shows the SPDT RF switch driver of the circuitry of FIG. 2 in detail.

FIG. 3B shows SPDT RF switch driver 16 of FIG. 2 in detail in which mode signal 60s is time-controlled through timing controller 62 and in which signal 60s and a reference signal from reference setting circuit 61 are ANDed at AND gate 63 to output signal 16s to SPDT RF switch 10.

Figure 3C:
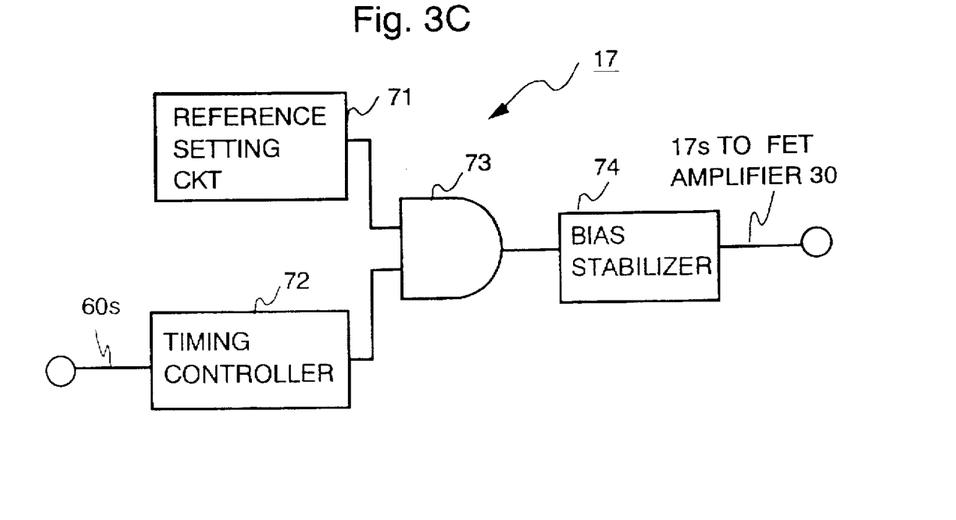
FIG. 3C shows the FET amplifier controller of the circuitry of FIG. 2 in detail.

FIG. 3C shows FET amplifier controller 17 of FIG. 2 in detail in which mode signal 60s is time-controlled through timing controller 72 and in which signal 60s and a reference signal from reference setting circuit 71 are ANDed at AND gate 73 to output a signal which is stabilized in bias stabilizer 74, with signal 17s being outputted to FET amplifier 3.

Referring to FIGS. 2 through 3C, a received radar signal is inputted to the receiving circuit and passes through SPDT RF switch 10 with the ground function remaining dormant upon reception because of the absence of a switch drive signal in the receiving period. The receiving circuit outputs the trigger signal as signal 5s from video amplifier 5 to inhibit circuit 15. Signal 5s is NORed with the then absent input of mode signal 60s to output signal 15s to controller 60. Upon reception of signal 15s or the trigger signal to operate controller 60, controller 60 outputs mode signal 60s to inhibit circuit 15, SPDT RF switch driver 16 and FET amplifier controller 17, respectively, as well as trigger signals to sweep generator 7 and transmitting gate 8 to start a transmitting operation in the transmitting circuit. Transmitting gate 8 outputs the transmitting gate signal exclusively to microwave oscillator 9 in this embodiment.

Upon reception of mode signal 60s from controller 60 in the transmitting period, SPDT RF switch driver 16 outputs signal 16s as the switch drive signal to SPDT RF switch 10 in a manner such that signal 16s is outputted at a later time than the output of the transmitting gate signal from the transmitting gate 8 and kept on a predetermined duration as a transmitting leakage prohibit period controlled by timing controller 62 so that the ground function is driven ON longer and later than the transmitting period for blocking the leakage of the powerful transmit wave signal. FET amplifier controller 17 outputs signal 17s to FET amplifier 30 in a manner that signal 17s is outputted at a later time than the output of the transmitting gate signal and kept on for a predetermined duration as an FET amplifier suppression period controlled by timing controller 72 so that the operation of FET amplifier 30 is suppressed longer and later than the transmitting leakage prohibit period. Inhibit circuit 15 inhibits the output of signal 15s as a trigger signal to controller 60 by NOR gate 52 while receiving signal 5s of the trigger signal from the receiving circuit. The output of signal 15s to controller 60 is inhibited to a time later than the outputs of signals 16s and 17s and the inhibition is kept on for a predetermined duration as a receiving inhibit period controlled by timing controller 51 in a manner such that controller 60 does not receive a trigger signal 15s for a period even longer and later than the transmitting period and the FET amplifier suppression period. The receiving circuit is thus well protected against the powerful transmit wave signal causing a transmit effect.

Figure 4:
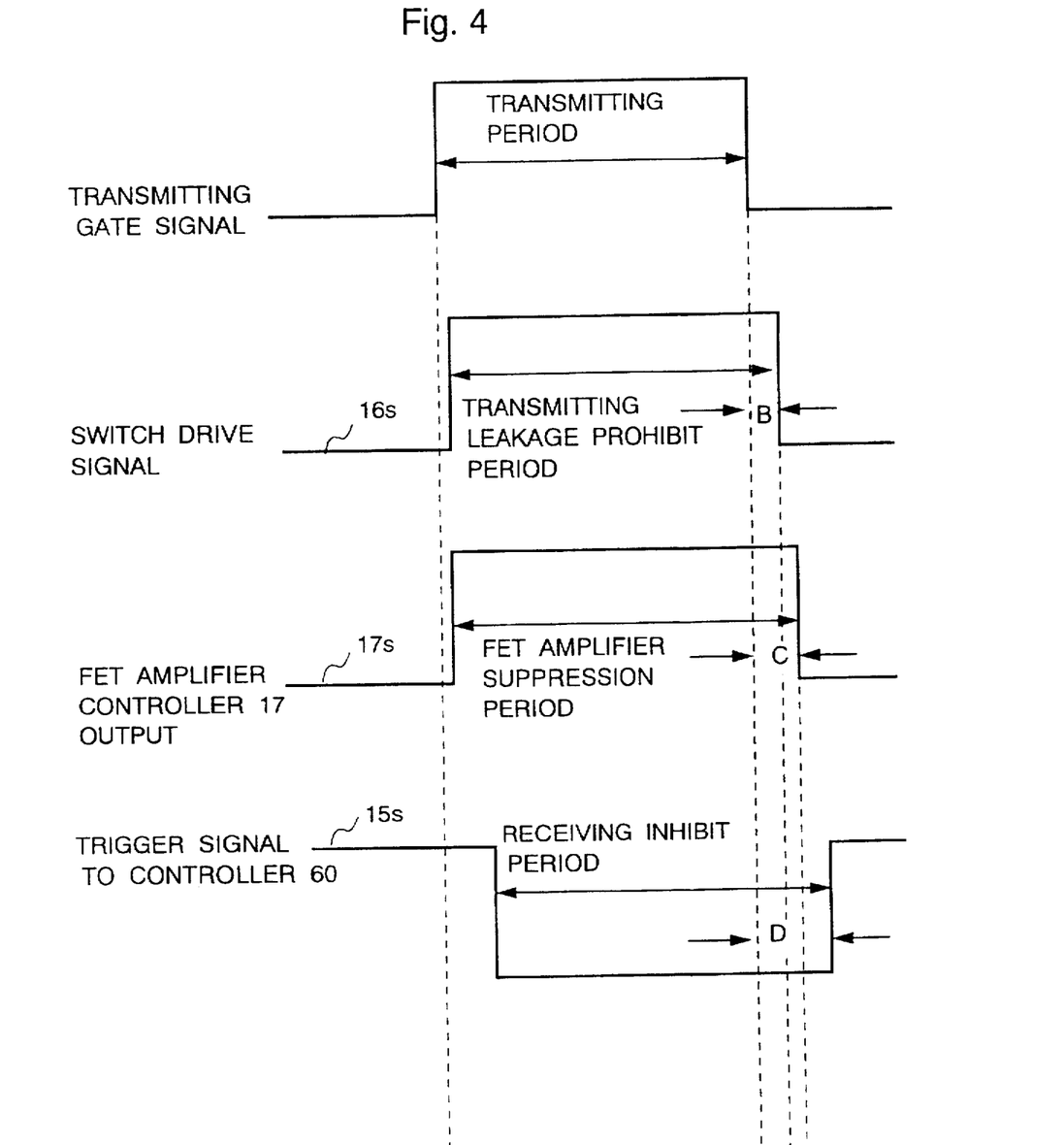
FIG. 4 shows a timing diagram illustrating the time related operation of the circuitry of FIG. 2.

FIG. 4 is a timing diagram of the time sequenced operation of the circuitry of FIG. 2 illustrating the above discussed operation including each signal output of FIG. 3A through 3C and the transmitting gate signal in the transmitting period. FIG. 4 shows the transmitting period by the transmitting gate signal, the transmitting leakage prohibit period by switch drive signal 16s, the FET amplifier suppression period by signal 17s, and the receiving inhibit period by the trigger signal 15s illustrating the masking period of signal 5s. As the timing diagram clearly shows, the transmitting leakage prohibit period lasts longer than the transmitting period by increment B, the FET amplifier suppression period lasts longer than the transmitting leakage prohibit period by increment C, and the receiving inhibit period lasts longer than the FET amplifier suppression period by increment D. This assures against erroneous reception in the receiving circuit causing a reception damage or malfunction by leakage and further against erroneous response transmission caused by reception damage. Thus the time-controlled circuit protects reception in the receiving circuit against the powerful transmit wave signal from the transmit effect during the transitional period and achieves a sound and reliable response transmission.

Embodiment 3.

As mentioned above, the present invention provides a sound and reliable response transmission for a radar transponder in relation to surrounding factors and utilizes circuitry having an SPDT switch with reflection compensation so that the transmission circuit is protected from reflection caused by the transmit effect of leakage. The reflection effect may be substantially further reduced with the provision of one or more additional impedance compensators provided with an SPDT switch between a circulator and a receiving circuit, or an impedance matching line in the switch having a shape for impedance compensating purpose.

Figure 5A:
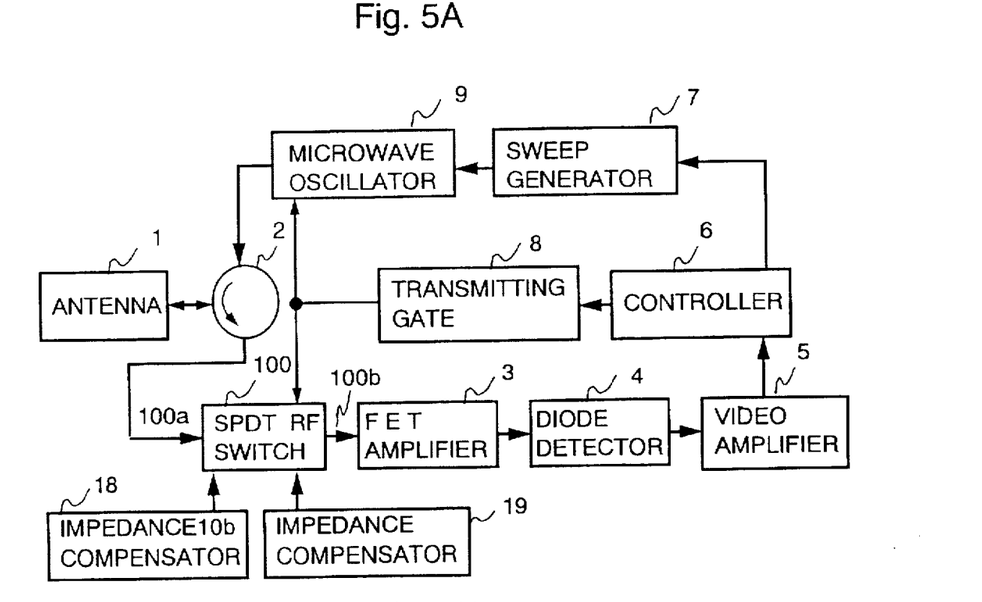
FIG. 5A shows a block diagram of the circuitry of a radar transponder according to a third embodiment of the present invention.

FIG. 5A shows a block diagram of the circuitry of a radar transponder according to another embodiment of the present invention. The embodiment of FIG. 5A modifies the embodiment of FIG. 1 with the replacement of SPDT RF switch 10 of FIG. 1 by SPDT RF switch 100 having additional inputs from additional external impedance compensators 18 and 19 for a further absorption of the reflection of the powerful transmit wave signal. Referring to FIG. 5A, impedance compensator 18 is connected to SPDT RF switch 100 at the input or entrance point 100a of the input signal from the circulator 2 for compensating the input impedance of the transmit wave signal from circulator 2, while impedance compensator 19 is connected to the switch 100 before outlet 100b of switch 100 for compensating the output impedance of the output signal from SPDT RF switch 100.

Figure 5B:
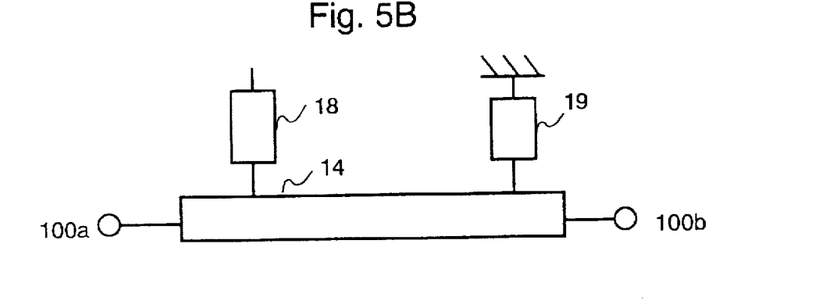
FIG. 5B shows a simplified partial diagram of an impedance matching line and external impedance compensators as a variation of those of FIG. 5A.

FIG. 5B shows a simplified partial diagram of impedance matching line 14 and external impedance compensators 18 and 19 as a variation of those of FIG. 5A showing one implementation of SPDT RF switch 100. This implementation, having switching elements equivalent to those 11a, 11b, 12, and 13 of FIG. 1B which are not shown in this simplified partial diagram, has the same effect as that of SPDT RF switch 10 of FIG. 1B or 100 of FIG. 5A. Referring to FIG. 5B, external impedance compensators 18 and 19 are connected in the same manner as discussed in FIG. 5A and have an open stub and a shunt stub, respectively, for a finer and ideal impedance compensation.

Referring further to FIGS. 5A and 5B, the additional impedance compensators are to compensate for the case where an input signal is left ungrounded because of an imperfect ground property of pin-diode 11b, which is shown in FIG. 1 but which is not shown in FIGS. 5A and 5A, whose ground function only covers a limited range. Specifically with reference to FIG. 5B, the open stub with impedance compensator 18 provides a capacitance for eliminating the inductance effect of impedance matching line 14, while the shunt stub with impedance compensator 19 provides an inductance for eliminating the capacitance effect of an output impedance in order to provide an optimal input impedance to the receiving circuit.

A reflection-compensating operation according to this embodiment is more effective with the additional impedance compensators, in comparison with that of the first embodiment of FIG. 1, especially in the transmitting period when the SPDT RF switch is blocking the powerful transmit wave signal by the transmit effect with the ground function driven ON. According to the first embodiment of FIG. 1, the SPDT RF switch 10 of FIG. 1 alone may not fully block the transmit wave signal completely or ideally and some reflection might therefore still occur or remain. Referring to the present embodiment, on the other hand, the additional impedance compensators of FIGS. 5A or 5B fully compensate the impedance corresponding to the remaining element of reflection and remove the remaining reflection effectively to achieve an essentially ideal reflectionless condition. This reflectionless circuitry secures a transmitting operation in the transmitting circuit and assures a sound and reliable response transmission from the radar transponder.

Figure 6A:
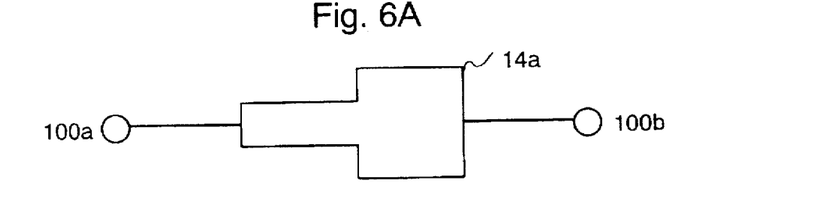
FIG. 6A shows a simplified partial diagram of an impedance matching line in an emphatic manner as a variation of the impedance matching line of FIGS. 5A or 5B.
Figure 6B:
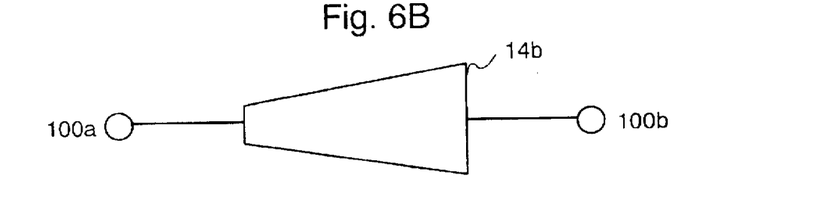
FIG. 6B shows a simplified partial diagram of an impedance matching line in an emphatic manner as a variation of the impedance matching line of FIGS. 5A or 5B.

FIGS. 6A and 6B show simplified partial diagrams of impedance matching lines 14a and 14b, respectively, representing in different shapes as variations of impedance matching line 14 of FIGS. 5A or 5B. Each shape of impedance matching lines 14a and 14b contributes by itself to an impedance compensation. Impedance matching line 14a is a stretch of line having portions of different sizes in width, e.g., a narrower input end and a wider output end, in a step-like manner with parallel sides, while impedance matching line 14b is a stretch of line similar to impedance matching line 14a but with the width varying in a continuous smooth manner from one end to the other. Such a narrower input end of an impedance matching line, in fact, has the same effect as that of an impedance matching line having a smaller inductance at an input end, and in other words has an impedance compensating function equivalent to that of impedance compensator 18 provided at an input side of the impedance matching line 14 of FIGS. 5A or 5B.

Thus, according to this embodiment, impedance is effectively compensated on the quarter-wave impedance matching line resulting in absorbing adverse reflection in an ideal manner in the reflection-compensating operation of the circuitry, which secures a sound and normal transmitting operation in the transmitting circuit and above all assures a sound and reliable response transmission of the radar transponder.

Embodiment 4.

Further consideration of a sound and stable reception in the receiving circuit designed for amplifying weak radar signals, may require that environmental effects, other than the transmit effect, to which the receiving circuit is exposed, must not be overlooked. For example, temperature variations may cause reception damage as one of environmental factors in the receiving circuit. In this respect, the receiving circuit requires thermal sensitivity in coping with changes in temperature over a wide thermal range inside and outside so as to output a stable video signal as the trigger signal.

Figure 7:
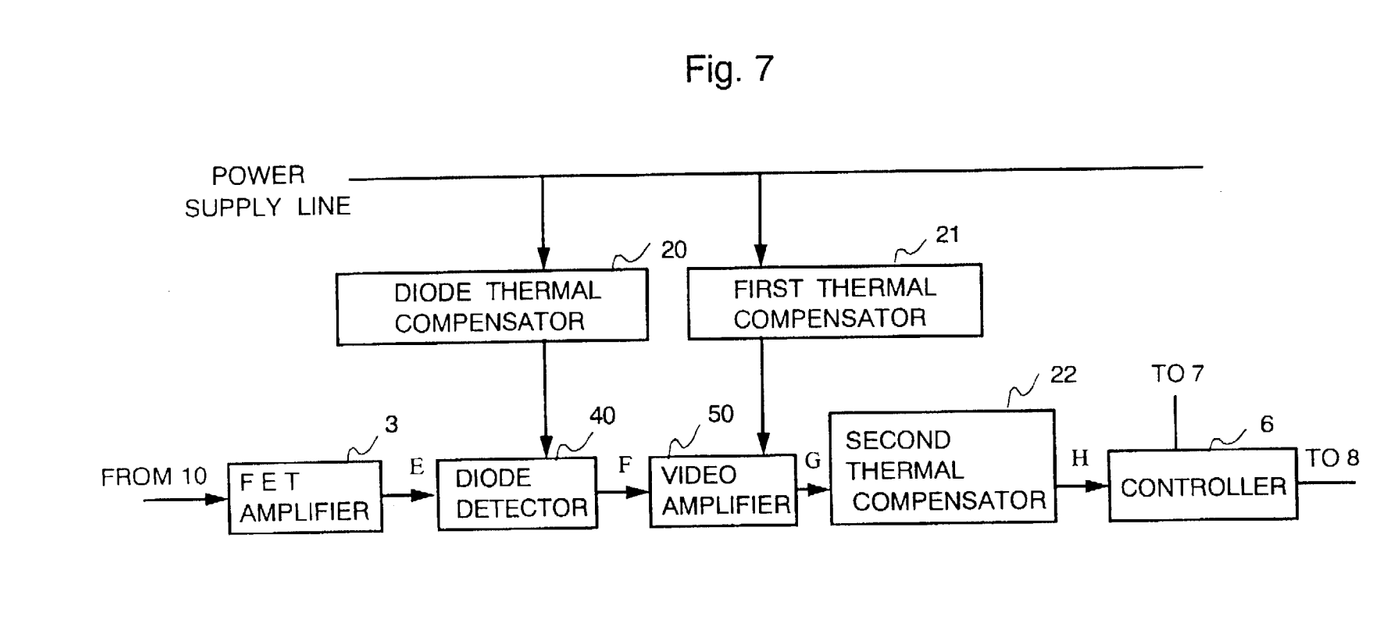
FIG. 7 shows a partial block diagram of the circuitry of a radar transponder according to a fourth embodiment of the present invention illustrating a thermally responsive receiving circuit.

FIG. 7 shows a partial block diagram of the circuitry of a radar transponder according to another embodiment of the present invention illustrating a thermally sensitive receiving circuit for a thermally responsive operation. The embodiment of FIG. 7 modifies the embodiment of FIGS. 1 or 5 with the provision of a new receiving circuit including diode detector 40, diode thermal compensator 20 for compensating the diode characteristics of diode detector 40 in relation to thermal effects, video amplifier 50, and first and second thermal compensators 21 and 22 for compensating the output characteristics of video amplifier 50 in relation to thermal effects These elements replace the receiving circuit of FIGS. 1 or 5 including diode detector 4 and video amplifier 5.

Figure 8A:
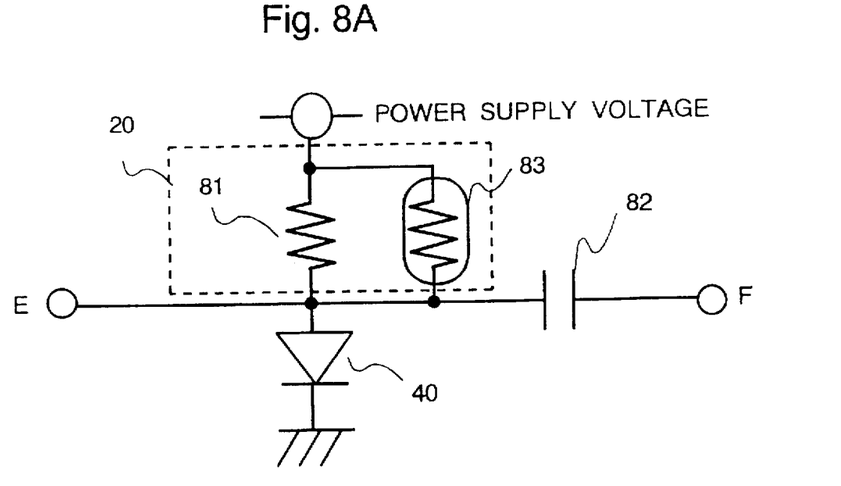
FIG. 8A shows the diode thermal compensator illustrating its thermally responsive circuit in relation to the diode detector of FIG. 7 in detail.

FIG. 8A shows diode thermal compensator 20 of FIG. 7 including resistor 81 and thermistor 83 illustrating a thermally responsive operation in relation to diode detector 40 having a ground end in an operating area between input E and output F of diode detector 40 on the transmission line. Diode thermal compensator 20 compensates the diode characteristics of diode detector 40 in a manner that thermistor 83 compensates the increase in the output current from diode detector 40 in proportion to a rise in temperature in detector 40. The output signal from the diode detector 40 is optimized via a condenser 82 connected to the next stage of operation.

Figure 8B:
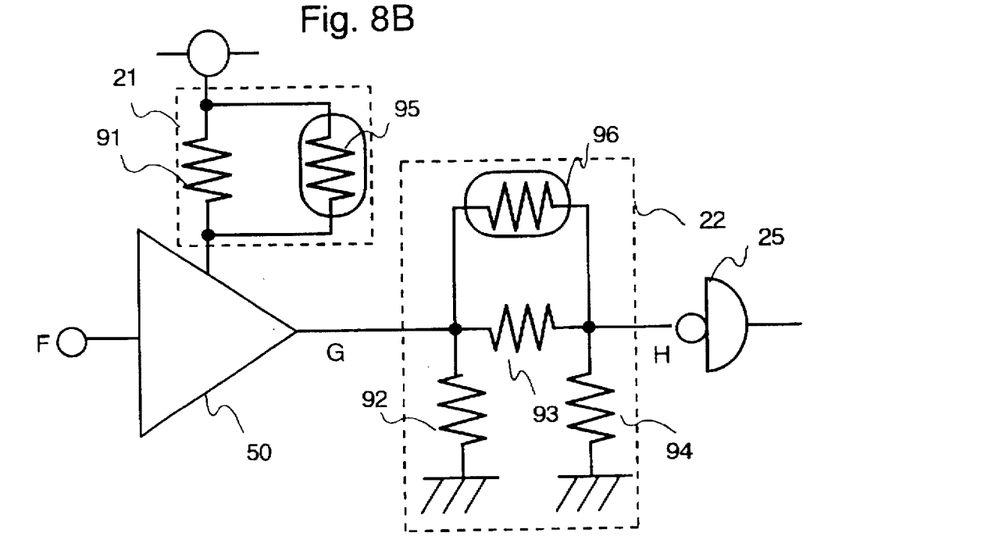
FIG. 8B shows the first and second thermal compensators illustrating thermally responsive circuits in relation to the video amplifier of FIG. 7 in detail.

FIG. 8B shows first and second thermal compensators 21 and 22 of FIG. 7 including resistor 91 and thermistor 95, and resistors 92, 93 and 94 and thermistor 96, respectively, illustrating a thermally responsive operation in relation to video amplifier 50 in an operating region between input F of video amplifier 50 and output H of second thermal compensator 22 on the transmission line. First and second thermal compensators 21 and 22 operate to compensate the output characteristics of video amplifier 50 in the same manner that thermistors 95 and 96 compensate or offset a rise in video signal output resulting from a gain increased in proportion to a fall in temperature of a liner IC in video amplifier 50. The output signal from the second thermal compensator 22 is optimized at device 25 as the trigger signal.

Figure 8C:
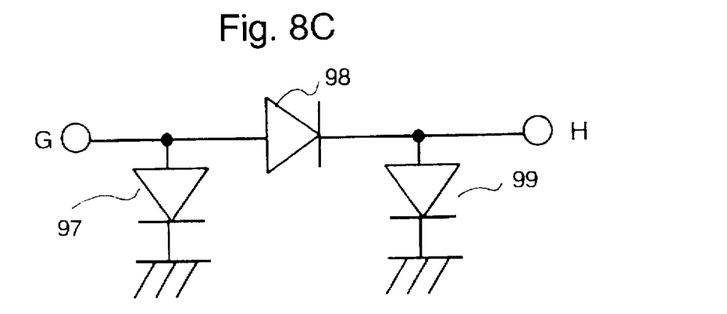
FIG. 8C shows a variation of the second thermal compensator of FIG. 8B.

FIG. 8C shows a variation of second thermal compensator 22 of FIG. 8B in an operating region between input G and output H. This variation, which includes diode 98 and grounded diode clusters 97 and 99, has the same thermal compensating effect as that of second thermal compensator 22.

With respect to the whole sequence of operations in the circuitry of the radar transponder according to this embodiment as a series of receiving and transmitting operations, other than with respect to those features discussed above concerning the additional thermally responsive operation of the receiving circuit, reference can be the description of the operations of the previous embodiments.

The thermally responsive receiving circuit according to this embodiment thus compensates or offsets the a problem of thermal effects on the signals in the receiving circuit and secures a sound and stable reception of the weak radar signal in a wider thermal range, which contributes greatly to a sound and reliable response transmission of the radar transponder.

Embodiment 5.

External noise is another environmental problem factor which may damage the reception of a weak radar signal. It is a further aspect of the present invention, in this respect, to protect the weak radar signal by providing a noise responsive receiving circuit in order to achieve a sound and stable reception. One possible source of external noise is encountered in relation to microwave signals surrounding the receiving circuit of the previous embodiments where the microwave effect can damage the video amplified signal. Where such microwave effect is present, the video amplifier in the receiving circuit therefore needs protection from the microwave effect in order to output a sound and optimal trigger signal to the controller.

Figure 9:
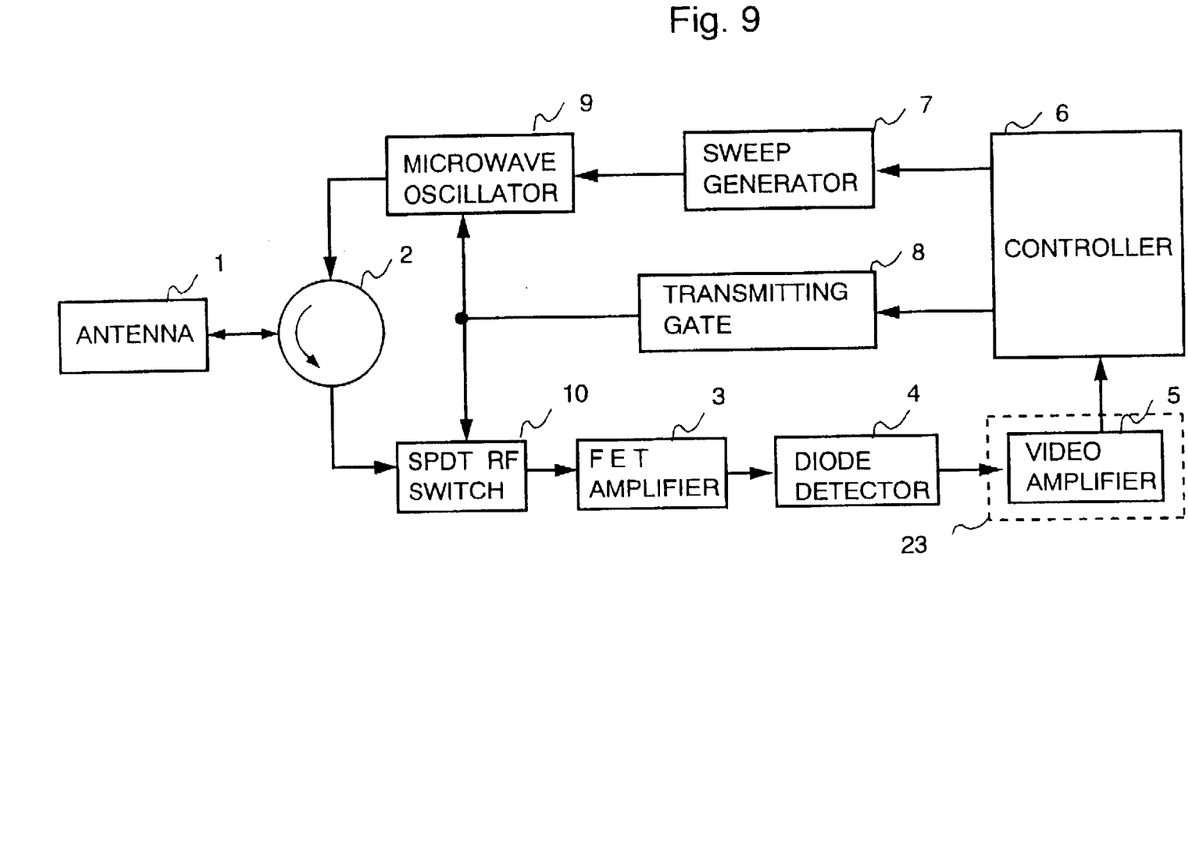
FIG. 9 shows a block diagram of the circuitry of a radar transponder according to a fifth embodiment of the present invention.

FIG. 9 shows a block diagram of the circuitry of a radar transponder according to another embodiment of the present invention. The embodiment of FIG. 9 modifies the embodiment of FIG. 1 by providing additional shield cover 23 covering around and shielding video amplifier 5 of FIG. 1 for protecting the amplifier and the amplified signal from electromagnetic waves and/or a static electricity. Because of the low gain of a weak radar signal and the high gain of the video amplified signal from the video amplifier, it is also effective, in addition to the shielding, that video amplifier 5 be separated and installed at a distance from the microwave circuit. The video amplifier may be installed or arranged on a circuit board in a concentrated manner in a location remote from a microwave circuit. The shield effect may be further intensified by including a ground layer in the multi-layer circuit board.

Embodiment 6.

With respect to the previous embodiments of the present invention, the circulator shown and described is not the only device which may function as a selector in this invention and it is to be understood that any suitable selector or switching unit can be selected to perform the function described.

Figure 10:
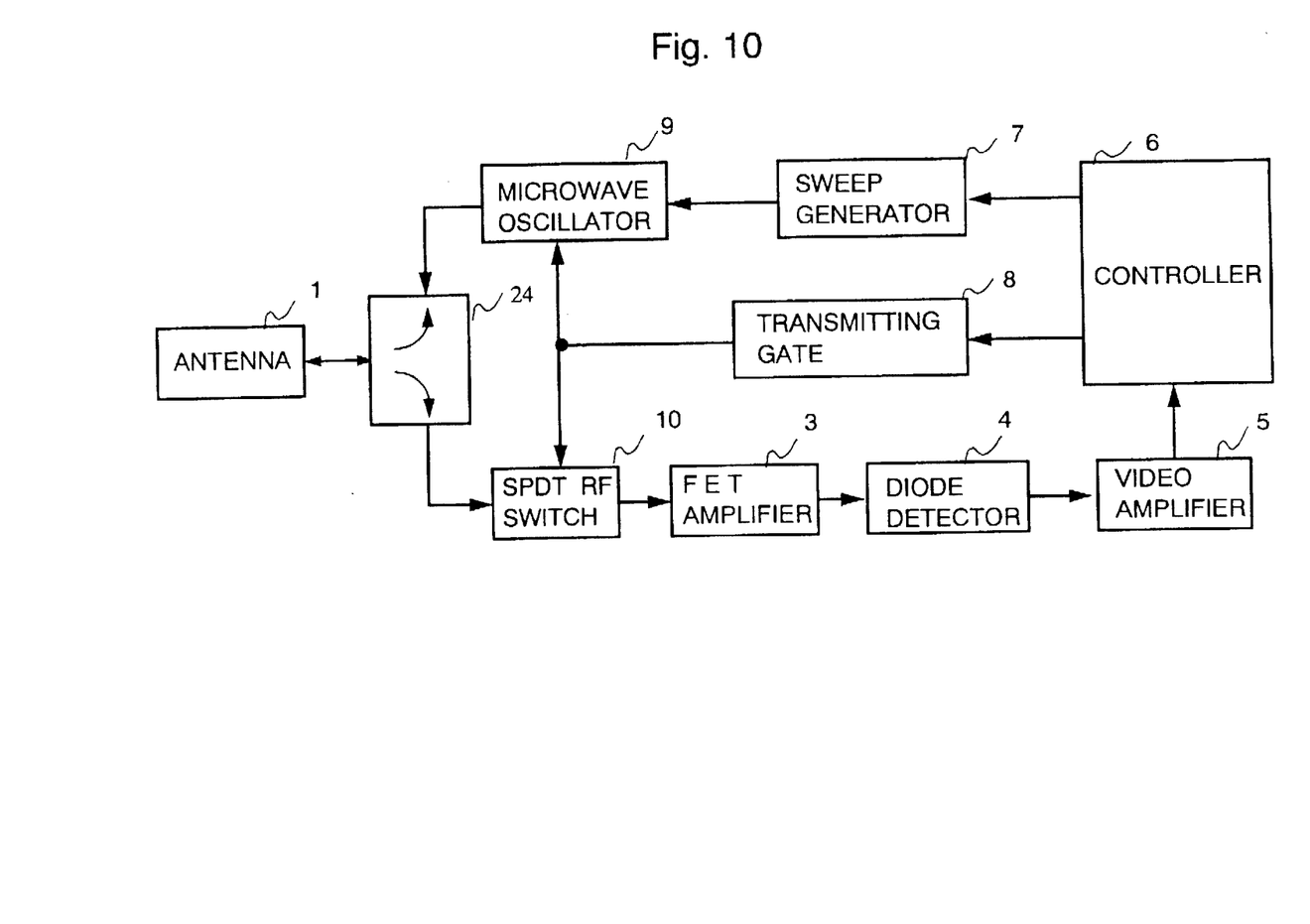
FIG. 10 shows a block diagram of the circuitry of a radar transponder according to a sixth embodiment of the present invention.

FIG. 10 shows a block diagram of the circuitry of a radar transponder according to another embodiment of the present invention illustrating circuitry including a new selector provided instead of the circulator of the previous embodiments. The embodiment of FIG. 10 modifies the embodiment of FIG. 1 by providing RF transfer switch 24 to replace circulator 2 of FIG. 1. With RF transfer switch 24, the circuitry performance of this embodiment is equivalent to that obtained from the first embodiment. This is also true for the use of the RF transfer switch 24 in the other embodiments of the present invention shown and described herein.

Having thus described several particular embodiments of the invention, various alternatives, alterations, modifications, and improvements will readily occur to those skilled in the art. Such alternatives, alterations, modifications, and improvements are intended to be part of the present invention, and therefore fall within the spirit and scope of the invention. Accordingly, the foregoing description is by way of example only, and is not intended to be limiting. The invention is limited only as defined in the following claims and the equivalents thereto.

What is claimed is:

1. A radar transponder for transmitting a transmit signal during a transmitting period after receiving a receive signal during a receiving period, comprising:

a transmit/receive antenna;

a receiving circuit for receiving the receive signal during the receiving period;

a selector connected to the transmit/receive antenna for selecting and connecting the transmit signal to the transmit/receive antenna during the transmitting period and for selecting and connecting the receive signal from the transmit/receive antenna to the receiving circuit during the receiving period; and a radio frequency switch connected between the selector and the input of the receiving circuit for terminating the transmit signal to ground before the input of the receiving circuit during the transmitting period and for passing the receive signal through to the input of the receiving circuit during the receiving period.

2. The radar transponder according to claim 1, wherein the radio frequency switch is driven by a switch driving signal and wherein the switch includes:

a reflectionless terminator connected at the input side of the switch relative to the receiving circuit;

a line connected between the input side and the output side of the switch for impedance matching with the transmit signal; and a diode connected to the output side of the switch relative to the receiving circuit for terminating the transmit signal to ground upon application of the switch driving signal to the switch during the transmitting period and for isolating the receive signal from ground during the receive period.

3. The radar transponder according to claim 2, wherein the line has an equivalent length of one quarter of the wave length of the transmit signal.

4. The radar transponder according to claim 1, including means for operating the switch to continue to terminate the transmit signal to ground for a period extending later than the end of the transmitting period; and wherein the receiving circuit thereby begins to receive the receive signal at a time later than the end of the transmitting period.

5. The radar transponder according to claim 4, further comprising means for controlling the time at which the receiving circuit begins to receive the receive signal to a time later than the time at which the switch ends the termination to ground of the transmit signal.

6. The radar transponder according to claim 2, further comprising an impedance compensator connected at one end of the line for reducing reflection of the transmit signal.

7. The radar transponder according to claim 6, wherein the impedance compensator is connected at an input side of the line and includes an open stub.

8. The radar transponder according to claim 6, wherein the impedance compensator is connected at an output side of the line and includes a shunt stub.

9. The radar transponder according to claim 2, wherein the line is formed in a shape which increases in width at one end of the line.

10. The radar transponder according to claim 1, wherein the receiving circuit includes a diode detector and a first temperature compensation circuit for compensating the current in the diode detector as a function of temperature.

11. The radar transponder according to claim 1, wherein the receiving circuit includes a video amplifier and a second temperature compensation circuit for compensating the output of the video amplifier as a function of temperature.

12. The radar transponder according to claim 1, wherein the receiving circuit includes a video amplifier having an electro-magnetic shield for shielding the video amplifier against electro-magnetic radiation.

13. The radar transponder according to claim 1, wherein the selector is a circulator.

14. The radar transponder according to claim 1, wherein the selector comprises a second RF switch.

15. A method of receiving a signal at a radar transponder having a receiving circuit for receiving a receive signal during a receiving period and means for transmitting a transmit signal during a transmitting period, the method comprising the steps of:

providing an RF switch before the input of the receive circuit and terminating the transmit signal to ground through the RF switch during the transmitting period; and receiving the receive signal through the RF switch and isolating the receive signal from ground during the receiving period.

* * * * *